3,672,838
ANALYTICAL METHOD AND APPARATUS USING DIFFUSION ACROSS A BOUNDARY BETWEEN LIQUIDS
Ronald Trcka, Berwyn, and Paul H. Sherrick, Winnetka, Ill., assignors to Sargent-Welch Scientific Company, Skokie, Ill.
Continuation-in-part of application Ser. No. 787,900, Dec. 30, 1968, which is a continuation-in-part of application Ser. No. 544,165, Apr. 21, 1966. This application Sept. 10, 1970, Ser. No. 71,202
Int. Cl. G01n *13/00, 21/24, 33/16*
U.S. Cl. 23—230 R
19 Claims

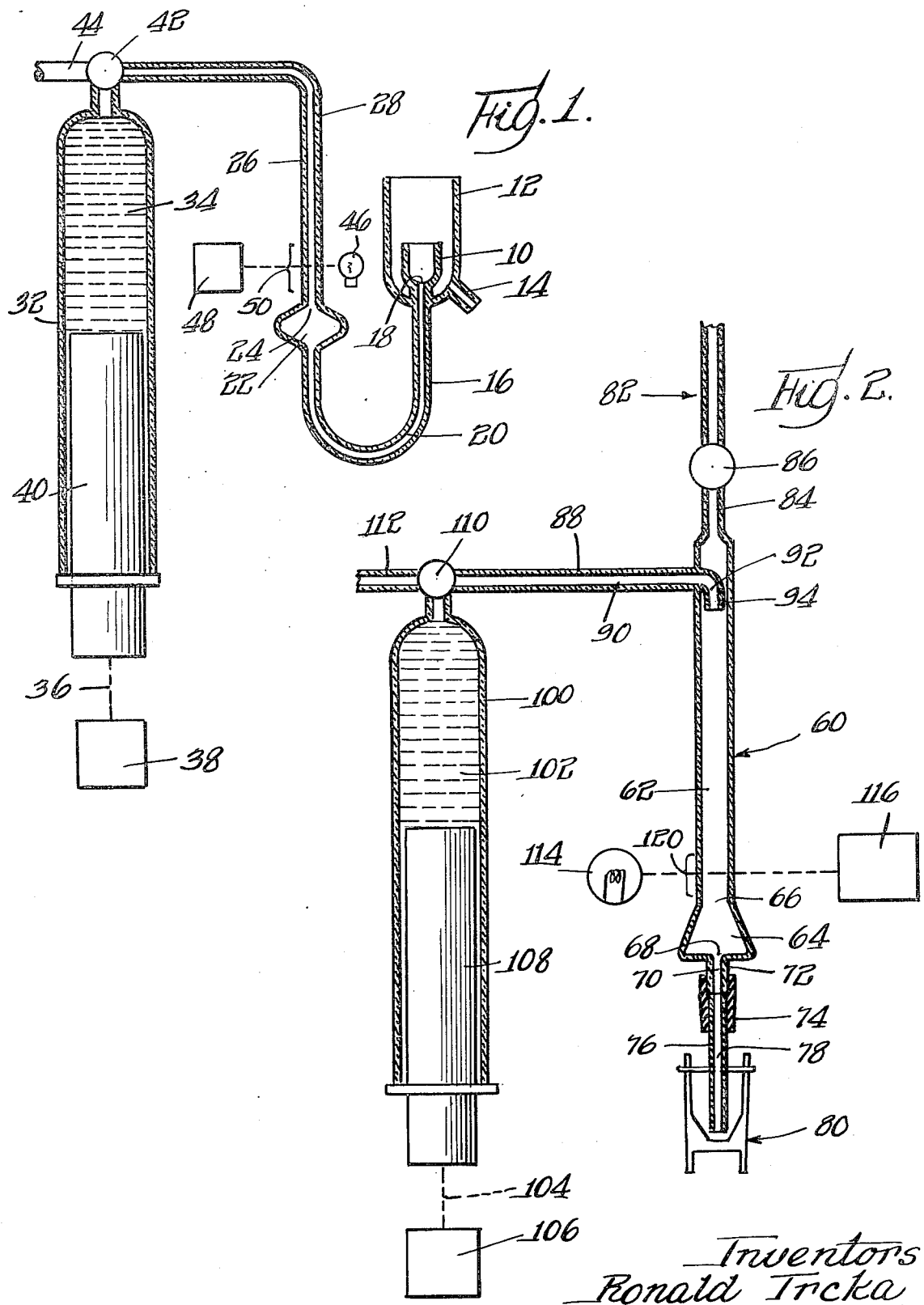

ABSTRACT OF THE DISCLOSURE

A method of, and apparatus for, obtaining a quantitative indication of a constituent in a liquid, for example, a crystalloidal constituent such as glucose in blood, in its mixture with other materials, which involves bringing a constituent carrying liquid into contact with another liquid to form a relatively stable boundary between the liquids, allowing diffusion to occur across the boundary, and, without disrupting the boundary, conveying the the boundary to an analyzing zone where a measurement is obtained which is indicative of the concentration of the constituent in the constituent carrying liquid. Colorimetric or photometric techniques advantageously are employed in making the measurement, and the transmittance change at, or proximal to, the boundary desirably is registered by an electrical signal which can be used to energize suitable recording devices to provide visual data relative to the concentration of the constituent in the constituent carrying liquid.

---

This application is a continuation-in-part of application Ser. No. 787,900, now abandoned, filed Dec. 30, 1968, the latter application, in turn, being a continuation-in-part application of application Ser. No. 544,165, filed Apr. 21, 1966, now abandoned.

The present invention relates to a method of, and apparatus for, analyzing fluids, such as body fluids, for the purpose of obtaining a quantitative determination of a specific constituent in the fluids.

Various methods of analyzing body fluids, such as blood or serum, for glucose, urea, protein, or other constituents, are known. Generally speaking, whether the analyses are performed manually or with continuous-flow apparatus, methods heretofore employed for this purpose have at least one short-coming in common, namely, the necessity for separating, by precipitation and filtration, or by dialysis, substances which interfere with the available analytical procedures for enabling a quantitative determination of the desired constituent to be made. The separation, when performed manually, is exacting, cumbersome and time consuming, and, when performed mechanically, requires highly specialized, complex and costly equipment.

In accordance with the present invention there are provided an analytical method, and apparatus, which are simple and relatively inexpensive, and which eliminate the separation step common to heretofore used methods for analyzing fluids such as blood or serum. The method and apparatus of this invention lend themselves to essentially automated techniques, and enable a quantitative determination of a desired constituent to be accurately obtained in a short time. While the present invention will be de-described in detail hereinafter with particular reference to its applicability to analyzing blood, serum, and other body fluids, particularly for glucose, urea, chloride, or protein, it should be understood that the description with relation thereto is presented only by way of illustrating the invention and should not be construed as limitative of its broader aspects. In this connection, it should be pointed out that the invention can be effectively utilized to analyze numerous and diverse substances including drugs, foods, beverages, chemicals, boiler water, plating solutions, fertilizers and many others.

In brief, the method of this invention involves the steps of contacting a constituent carrying liquid with a second liquid, or reagent solution, to form a relatively stable boundary at their surface of contact, allowing diffusion across the boundary to take place, and, without disrupting the boundary, conveying the boundary to an analyzing zone where a measurement is obtained which, when compared against a standard sample of known concentration, is indicative of the concentration of the constituent in the constituent carrying liquid. Depending upon the nature of the constituent upon which a measurement is desired, diffusion may take place across the boundary in the direction of the second liquid, or reagent solution, or in the direction of the constituent carrying liquid. The two liquids are characterized in that they have different densities thereby to minimize convection at the boundary whereby diffusion can take place across the boundary. In accordance with a preferred practice of the method, the constituent carrying liquid and the second liquid, or reagent solution, are miscible.

In carrying out the method of this invention, initial contact most advantageously is made in a tube of small bore between a constituent carrying liquid and a second liquid or reagent solution, having different densities, to establish a sharply defined, stable boundary between the two liquids. The boundary, or contact plane, between the liquids is thereafter, by slow, steady flow, enlarged or expanded to allow a large quantity of material to diffuse in a relatively short time. In this connection, it has been observed that initial diffusion across the boundary is very fast and since each diffusable species appears in either liquid at a rate determined by its specific diffusion coefficient and its concentration gradient, a selective transfer is achieved quickly and in a quantity which obviates the need for utilizing conventional separative procedures. The boundary is then moved to a region of restricted cross-section to bring the diffusion zone into dimensions suitable for selective measurement with an analytical instrument. The movement of the boundary, or contact plane, between the constituent carrying liquid and the second liquid, or reagent solution, desirably is continuous, and is carried out at a flow rate such that no significant convectional disturbance occurs. While the ratios of expansion and reduction of the boundary, or contact plane, from the area of its initial formation to the region where a measurement is made are variable, the generally optimum objectives of the invention are met with an expansion ratio of the order of about one to one hundred, and a reduction ratio of the order of about six to one. As indicated, the constituent carrying liquid and the reagent solution must have different densities. This difference, also, is variable, but generally speaking should be in the range of about 3% to about 20%, especially desirably from about 4 to 5% to about 10%.

Photometric or colorimetric techniques can be used to advantage in making selective measurements of constituents in accordance with the practice of the present invention. In utilizing the method to analyze the glucose content of a blood sample, for instance, the reagent solution employed in making the glucose analysis desirably will contain all of the components necessary for the development of a color which is indicative of the concentration of the glucose in the blood sample. The color change in the reagent solution resulting from the glucose diffusate can be registered by an electrical signal which can be used to energize suitable recording devices to provide visual or printed data relative to the quantity of glucose in the sample. After a measurement has been made, diffusate- and sample-contaminated areas of apparatus used can be purged with fresh reagent in preparation for the next analysis.

The reagent solution employed in the method of this invention will, of course, vary in accordance with the nature of the constituent or species upon which a quantitative determination is desired. Exemplary of a reagent solution having special utility in making a blood glucose determination by the method of the present invention is an aqueous enzymatic solution comprising a mixture of 13 grams of sodium acetate, 10 ml. of a standard glucose oxidase-peroxidase preparation typified by the one available commercially under the trademark "Fermcozyme 952 DM" (G. D. Searle and Co.) and 20 ml. of a 1% o-tolidine hydrochloride solution, which mixture has been diluted to one liter and the pH thereof adjusted to 4.2 with acetic acid. Exemplary of a sample diluent to be used in connection with the foregoing reagent is an 8% aqueous sodium nitrate solution.

Referring now to the accompanying drawing, FIGS. 1 and 2 illustrate in somewhat schematic form embodiments of apparatus having utility for carrying out the method of the present invention. In each instance, the apparatus, as shown, is an integrated unit which can be adapted to a completely automated or semi-automated operation. In FIG. 1, the apparatus comprises a cup-like constituent carrying liquid or sample receiving receptacle 10 positioned near the base of a larger cup-shaped waste-disposal receptacle 12 having a drain 14. The receptacle 10, which may take the form of a removable tube, or the like, is joined at its base to conduit 16 and is provided with a bottom opening 18 which communicates with a restricted bore 20 in the conduit 16. The bore 20 interconnects the opening 18 in the base of the receptacle 10 with an enlarged diffusion section or chamber 22 formed in the conduit 16. The chamber 22 has a narrow opening 24 at its upper end which communicates with a bore 26 of similar cross-section in a conduit 28 which is joined to the outlet end of a reagent solution reservoir 32 containing a quantity of a suitable reagent solution 34. The reservoir 32 advantageously comprises a motor driven displacement type burette which is operatively connected, as schematically represented by dotted line 36, to a reversible motor 38. The burette is provided with a plunger 40, which moves up or down in the burette in response to the action of the motor 38, and a stopcock 42 having passageways therein for communicating with the bore 26 in the conduit 28 and a refill conduit 44. The embodiment illustrated is especially suitable for analyzing fluids by photometric or colorimetric techniques and to this end a light source 46, associated with a sensor exemplified by photoelectric tube 48 of a photometric system (not shown) of any of the types well known in the art, is positioned at a measuring zone 50 located above the opening 24 of the chamber 22. The action of the motor 38 and the photometric system associated with the light source 46 and the photoelectric tube 48 can be programmed by adjustable timers, push buttons, tape, or the like, to minimize manipulation of samples and to provide accurate and consistent results. Typical photometric systems are disclosed in U.S. Pats. Nos. 2,797,149 and 3,239,312.

In utilizing the embodiment of the apparatus shown, the bore 26, the chamber 22 and the bore 20 are first filled with the reagent solution 34 from the reservoir 32. In a programmed operation this will occur automatically by the action of the motor 38 in flushing or purging the apparatus after each analysis, as will be described hereinafter. A quantity of a constituent carrying liquid, a blood sample, for instance, upon which a quantitative determination for glucose is to be made, is then carefully introduced into the sample receiving receptacle 10 to provide a boundary or contact plane at the opening 18 in the receptacle 10. The motor 38 is energized causing the plunger 40 to move downwardly whereby the reagent solution 34 in the bore 20, the chamber 22 and the bore 26 is drawn into the reservoir 32 through the stopcock 42. The boundary or contact plane between the sample and the reagent solution at the same time, is thereby caused to move downwardly through the bore 20 in the conduit 16 and then upwardly into the chamber 22. The motor 38 is operated at a speed such that there is no disruption of the boundary either in the bore 20 or the chamber 22 thereby enabling the establishment of an enlarged, relatively stable boundary between the sample and the reagent solution in the chamber 22. The relatively large boundary in the chamber 22 enables mass diffusion of the glucose to proceed at a rapid rate in preference to the slower diffusing, higher molecular weight interfering substances in the sample such as the proteins, lipids and hemoglobin bodies. The boundary is continuously elevated in the chamber 22 to a predetermined level below zone 50. The diffusate, excluding slow diffusing contaminants in the immediate contact plane, is thereby moved upwardly through opening 24 of the chamber 22 and into the analyzing zone 50 where its concentration gradient is minimized and a reproducible concentration of the constituent to be determined is presented for measurement. The motor 38 is then de-energized. The light source 46, positioned at the zone 50, and the photoelectric tube 48 of the associated photometric system, in accordance with well known principles, act to produce an electrical voltage proportional to the amount of light transmitted through the diffusate at the zone 50. This change in voltage is used to provide direct readings of the concentration of the colored diffusate in the reagent solution which when compared against a standard solution gives a quantitative determination of the percentage of glucose in the blood sample.

After the measurement has been made as described, the motor 38 is energized in a manner to cause the plunger 40 to move upwardly. Reagent solution 34 from the reservoir 32 passes through the bore 26, the chamber 22 and the bore 20 to flush or purge the apparatus of used reagent solution and sample. This reverse movement of the plunger 40 continues until all of the used reagent solution and sample have been flushed from the receptacle 10. The waste material is removed from the receptacle 12 through the drain 14. After the flushing operation has been completed, the action of the motor 38 is reversed, and reagent solution is withdrawn from the receptacle 10 to the opening 18 in the base thereof in preparation for introduction of the next fluid sample. The flushing or purging of the apparatus substantially eliminates the possibility of the next succeeding sample being contaminated and thereby enables greater accuracy to be attained. Alternatively, flushing of the cup 10 may be eliminated by substituting, as suggested hereinabove, a separable tube fitting on the terminal section of conduit 16 which can be removed and replaced after flushing. With such an arrangement, only minimal quantities of reagent solution would be used in the flushing operation.

In FIG. 2 of the drawing, there is shown a preferred embodiment of apparatus having utility in carrying out the method of the present invention. As illustrated, the apparatus comprises an elongated, hollow, tubular body portion 60 having an internal bore 62. The body portion 60 at one of its ends is joined to a diffusion section or chamber 64 which may be shaped as shown, or more desirably, may be shaped as chamber 22 of FIG. 1. The chamber 64 communicates with the bore 62 in the body portion 60 through an outlet 66 which desirably is coaxial with and is substantially the same diameter as, the bore 62. The chamber 64 has a restricted inlet 68 which communicates with a restricted bore 70 in an extension 72 joined to the base of the chamber 64. The extension 72 is connected by means of a coupling 74 to a small diameter intake tube 76 having an internal bore 78 which communicates, and is coaxial, with the bore 70 in the extension 72 and the inlet 68 of the chamber 64. The intake tube 76 is adapted to be placed in a constituent carrying liquid or sample receiving cup 80, as shown.

The body portion 60, at its other end, is joined to an overflow tube 82 having an internal bore 84 which communicates with the bore 62 in the body portion 60. A motor driven stopcock 86, the function of which will become clear as the description proceeds, advantageously is provided in the overflow tube 82. The body portion 60 further is joined to a reagent solution supply conduit 88 having an internal bore 90 which communicates with the bore 62 in the body portion 60 through a restricted bore 92 of a downwardly curved inlet tube 94. The tube 94 is positioned in the bore 62 and constitutes an extension of the reagent solution supply conduit 88. The diameter of the tube 94 is such that it does not interfere with the passage of fluids from the bore 62 into the overflow tube 82. Alternatively, the outlet end of the conduit 88 can be sealed to the wall of the body portion 60, thereby eliminating the curved inlet tube 94.

As in the previously described embodiment, the reagent solution supply conduit 88 is joined to the outlet end of a reagent solution reservoir 100 containing a quantity of a suitable reagent solution 102. The reservoir 100, like the reservoir 32 of said previously described embodiment, advantageously comprises a motor driven displacement type burette which is operatively connected, as schematically represented by dotted line 104, to a reversible motor 106. The burette is provided with a plunger 108, which moves up or down in the burette in response to the action of the motor 106, and a stopcock 110 having passageways therein for communicating with the bore 90 in the conduit 88, and a refill conduit 112 which is connected to a reagent solution supply source (not shown).

The embodiment of the apparatus of the present invention just described, like the first described embodiment, is especially suitable for analyzing fluids by photometric or colorimetric techniques and to this end a light source 114, associated with a photoelectric tube 116 of a photometric system (not shown) of any of the types referred to hereinabove, for example, is positioned at a measuring zone 120 located above the outlet 66 of the chamber 64. As indicated, the action of the motor 106 and the photometric system associated with the light source 114 and the photoelectric tube 116 can be programmed by adjustable timers, push buttons, tape, or the like, to minimize manipulation of samples and to provide accurate and consistent results. In order to maintain a relatively constant temperature throughout a run, the diffusion chamber of the apparatus advantageously can be mounted in a temperature controlled block (not shown). In following this practice, in order to minimize the amount of time required for the reagent solution to approach the proper temperature between runs, it is desirable to pre-temper a sufficient amount of reagent solution used for flush out and refilling of the diffusion chamber. For this purpose, a heating coil (not shown) with appropriate valving connections can be provided as a by-pass to conduit 88 during the flushing and re-filling operation. The coil conveniently can be controlled in temperature by the same thermal unit as that which controls the temperature of the fluid in the diffusion chamber.

In utilizing the embodiment of the apparatus illustrated in FIG. 2, the reservoir or burette 100, the tubular body portion 60, the chamber 64 and the intake tube 76 are first filled with the reagent solution 102. In a programmed operation, this will occur automatically by the action of the motor 106 in flushing or purging the apparatus after each analysis, as described hereinafter. A quantity of fluid, a diluted blood sample, for example, upon which a quantitative determination of glucose, for instance, is to be made, is introduced into the sample receiving cup 80. The cup 80 is then moved into position such that the intake tube 76 is inserted into the sample. The motor 106 is energized causing the plunger 108 to move downwardly whereby the reagent solution in the body portion 60 and the chamber 64 is drawn into the burette through stopcock 110 at a constant rate. The boundary or contact plane between the sample and the reagent solution, at the same time, is thereby caused to move upwardly into the chamber 64. The motor 106 is operated at a speed such that there is no disruption of the boundary in the chamber 64, thereby enabling the establishment of an enlarged, relatively stable boundary between the sample and the reagent solution in the chamber 64. As the boundary continuously proceeds upwardly in the chamber, the surface area and diffusion gradient are lessened and the colored band formed by the reaction of the reagent solution and the diffused glucose is broadened. As this band of color enters the measuring zone 120, the photometric system develops an electric signal which is recorded on a recorder (not shown). The boundary represents a point of maximum color intensity at the desired wavelength for measurement as well as a point where some interfering contaminants may be present. In order to reduce this interference as well as improve the Beer's Law relationship, it is advantageous to clip the electric signal in advance of the boundary or contact plane. The point of clipping will vary in accordance with the type of analysis being made with the apparatus. Thus, the clipping point for a glucose analysis may, or may not, be the same as for any other analysis. Clipping of the electric signal involves an electrical shorting of the recorder input or disabling of the balancing motor of the recorder (not shown) resulting in a curve which instantaneously drops to zero on the recorder chart or remains at the clipped level. After the clipping is completed, the motor 106 becomes de-energized. The cup 80 is then automatically removed an the stopcock 86 is opened, allowing the body portion 60, the chamber 64 and the intake tube 76 to completely drain of reagent solution and sample by reason of air entering through the overflow tube 82. Upon completion of draining, the stopcock 86 is closed and the stopcock 110 is rotated 180° such that the reservoir or burette 100 now directly communicates with the reagent solution supply source (not shown) through conduit 112. The motor 106 is energized causing the plunger 108 to move downward thereby filling the burette 100 with the reagent solution 102. The motor 106 is then de-energized and the stopcock 110 is rotated 180° which places the burette 100 in communication with the body portion 60, the chamber 64 and the intake tube 76. The motor 106 is re-energized, driving the plunger 108 upward. This results in a flush-out of the body portion 60, the chamber 64 and the intake tube 76 of sample from the previous run. When the plunger 108 has traversed approximately one-half of its total excursion, the stopcock 86 is opened. This permits any trapped air in the chamber 64 to be expelled through the overflow tube 82 resulting in a complete filling with reagent solution of the body portion 60 and the chamber 64, and partial filling of the overflow tube 82. Upon completion of the flushout operation, the motor 106 is de-energized. The stopcock 86 is then closed, and the apparatus is now ready for the next run.

The constituent or species to be measured in accordance with the practice of the present invention normally is detected in concentrations of less than millimolar both for economy of sample and to suit the optimum capability of photometric measurement. Stable colloids and suspensoids may be used as samples without difficulty, and most light to moderate precipitates are adequately eliminated by the automatic flushing and refilling feature of the apparatus. Colloidal absorbence or light scattering is avoided by measurement in the forward diffusion zone, or it can be treated as a blank correction, depending upon the type of determination. When the constituent or species to be measured is precipitated by the reagent solution in the diffusion zone, the quantity of such precipitate should be minimized by the greatest sample dilution which will yield a satisfactory reading scale with available instrumental sensitivity. Precipitation of species introduced into the system at concentrations of the order of about 0.1% are satisfactory. Further, in this same connection, when the constituent or species are proteins to be determined by specific precipitation and turbidimetry by the practice of this invention, using as a reagent solution a protein precipitant such as sulfo-salicylic acid, trichloracetic acid, phosphomolybdic acid, or the like, iso-electric precipitation should be prevented by preliminary salt formation in the diluted sample. Lactic, acetic or tartaric acids in the diluent serve this purpose. A standard diluent is a twenty to thirty percent water solution of lactic acid which serves both to stabilize the proteins and to provide adequate density. In reaction systems either employing or determining enzymes, buffer salts appropriate to the enzymes are used in the sample diluents to stabilize the proteins and to provide necessary density.

While there has been shown and described specific aspects of the present invention, it will, of course, be understood that various modifications and alternative procedures and constructions may be made without departing from the true spirit and scope of the invention. Therefore, it is intended by the appended claims to cover all such modifications and alternative procedures and constructions as fall within their true spirit and scope.

What is claimed is:

1. A method of obtaining a quantitative indication of a constituent in a liquid by diffusion across a contact plane between the liquids comprising contacting a constituent carrying liquid with a second liquid to form a relatively stable boundary between the two liquids, said liquids being characterized by having different densities whereby diffusion across the boundary between them can take place, allowing diffusion to take place across said relatively stable boundary, without physically disturbing said boundary, conveying said boundary to an analyzing zone without disrupting the boundary, and obtaining a measurement at said analyzing zone indicative of the concentration of the constituent in the constituent carrying liquid.

2. A method according to claim 1 wherein initial contact between the constituent carrying liquid and the second liquid is made in a zone of small cross-section, and is followed by movement of the boundary formed between the liquids to a zone of appreciably larger cross-section than the zone of initial contact.

3. A method according to claim 1 wherein the measurement is made by photometric means.

4. A method according to claim 1 wherein the boundary between the two liquids is maintained in continuous motion from the zone of its initial formation to the analyzing zone.

5. A method according to claim 1 wherein the measurement is made forwardly of the boundary when the constituent to be measured is diffusable into the second liquid and rearwardly of the boundary when the constituent to be measured is not diffusible into the second liquid, the second liquid in the latter instance being characterized in that it is capable of converting the constituent to a form which will enable a meaningful measurement to be made.

6. A method of obtaining a quantitative indication of a constituent in a liquid by diffusion across a contact plane between the liquids, comprising contacting a constituent carrying liquid with a second liquid in an area of reduced cross-section to form a small relatively stable boundary between the liquids, moving the boundary into an enlarged diffusion chamber in which the boundary is expanded, allowing differential diffusion to take place in the diffusion chamber at the expanded boundary without substantially disturbing the physical integrity of the boundary, then moving the expanded boundary from the diffusion chamber into an analyzing zone of reduced cross-section without disrupting the boundary, and obtaining a measurement at said analyzing zone indicative of the concentration of the constituent in the constituent carrying liquid.

7. A method of obtaining a quantitative indication of a constituent in its solution with other materials comprising bringing the constituent carrying solution into contact with a reagent solution to form a relatively stable boundary between the constituent carrying solution and the reagent solution, said reagent solution being characterized in that the desired constituent will diffuse more readily therein at said boundary than will interfering materials in the constituent carrying solution, allowing the desired constituent to at least partially diffuse into said reagent solution, conveying said boundary to an analyzing zone without adversely affecting said boundary, and obtaining a measurement at said analyzing zone indicative of the concentration of said constituent in the constituent carrying solution.

8. A method as claimed in claim 7 wherein the crystalloidal constituent is blood glucose and the reagent solution comprises a mixture of about 13 grams of sodium acetate, about 10 ml. of a glucose oxidase-peroxidase solution and about 20 ml. of a 1% o-tolidine hydrochloride solution, which mixture has been diluted to one liter and the pH thereof adjusted to about 4.2.

9. A method as claimed in claim 7 wherein the measurement is made by colorimetric means.

10. A method of obtaining a quantitative indication of a crystalloidal constituent in a liquid sample mixture containing noncrystalloidal material, said crystalloidal constituent being characterized by having a substantially greater speed of diffusion into a given reagent solution than that of said noncrystalloidal material, comprising contacting said reagent solution with said sample to form a small relatively stable boundary between said solution and said sample, passing said small boundary through a narrow conduit into an enlarged diffusion chamber in which the boundary is expanded without disrupting it, allowing differential diffusion to take place in said diffusion chamber at the expanded boundary without substantially disturbing the physical integrity of the boundary whereby said reagent solution will be enriched perferentially by said crystolloidal constituent, then passing the boundary from said diffusion chamber into a restricted analyzing zone, while substantially maintaining the physical integrity of the boundary, and obtaining a measurement of the diffusate at said analyzing zone indicative of the concentration of said crystalloidal constituent in the sample.

11. Apparatus for obtaining a quantitative indication of a constituent in its mixture with other materials comprising sample holding means for holding a sample of a mixture containing a constituent upon which a quantitative determination is desired, means for contacting said sample with a reagent solution to form a small, relatively stable boundary therebetween, an enlarged area in communication with said means for contacting the reagent and the sample for expanding said boundary, means for moving the boundary to an analyzing zone where the concentration gradient is minimized and the concentration presented for measurement is made reproducible and proportional to the concentration of the sought constituent in the original sample, and means associated with said analyzing zone for obtaining a measurement which is indicative of the concentration of the constituent in the sample.

12. Apparatus as claimed in claim 11 where in said means for contacting said reagent solution with said sample comprises an elongated, tubular member joined to a conduit connected to a source of the reagent solution and to an overflow conduit having automatically operated flow control means positioned therein.

13. Apparatus as claimed in claim 11 wherein said means for measuring the concentration of said constituent comprises a light source and a photoelectric tube associated with a photometric system.

14. Apparatus as claimed in claim 11 wherein said enlarged area comprises a chamber having an outlet and an inlet, the inlet of said chamber being connectable to sample intake means for conveying said small, relatively stable boundary into the chamber.

15. Apparatus as claimed in claim 14 wherein the outlet of the chamber is greater in cross-section that the inlet thereof.

16. Apparatus as claimed in claim 11 wherein said analyzing zone is between a source of the reagent solution and said enlarged area.

17. Apparatus as claimed in claim 16 wherein said source of reagent solution comprises a motor driven displacement type burette which is operatively connected to a reversible motor.

18. Apparatus as claimed in claim 11 wherein means is provided for flushing, with reagent solution from a source thereof, portions of the apparatus traversed by said boundary and said sample.

19. Apparatus as claimed in claim 18 wherein temperature controlled coil is associated with said means through which the reagent solution is by-passed during flushing and refilling of the apparatus with reagent solution.

References Cited

UNITED STATES PATENTS 3,510,260    5/1970    Krawetz et al. _____ 23—230 R

OTHER REFERENCES

Boltz, D. F., Colorimetric Determination of Nonmetals, pp. 26-7 (1958).

Mahal, H. S., Analytical Chemistry, vol. 31, pp. 1908-9 (1959).

Sandell, E. B, Colorimetric Determination of Metals, pp. 41-42 (1959).

MORRIS O. WOLK, Primary Examiner

E. A. KATZ, Assistant Examiner

U.S. Cl. X.R.

23—230 B, 253 R, 267 R, 292, 309